United States Patent [19]

Niibori et al.

[11] Patent Number: 4,494,707
[45] Date of Patent: Jan. 22, 1985

[54] APPARATUS FOR WINDING AND UNWINDING AN ELONGATED FLEXIBLE MEMBER

[75] Inventors: Kenji Niibori; Hisao Suda, both of Oyama, Japan

[73] Assignee: Seiwa Kagaku Kabushiki Kaisha, Japan

[21] Appl. No.: 466,887

[22] Filed: Feb. 16, 1983

[30] Foreign Application Priority Data

Feb. 22, 1982 [JP] Japan ................... 57-23675

[51] Int. Cl.³ .................. A47H 1/00; A01G 9/14; A63C 19/12
[52] U.S. Cl. .................. 242/67.2; 242/67.4; 242/73.5; 160/265; 47/17; 52/169.7
[58] Field of Search ............ 242/67.2, 67.4, 86.52, 242/68.7, 68.4, 73.5, 202, 203; 4/502; 273/27; 160/84, 265, 66, 70, 262; 52/169.7; 47/17

[56] References Cited

U.S. PATENT DOCUMENTS

| | | | |
|---|---|---|---|
| 1,915,529 | 6/1933 | Heiser | 160/70 |
| 2,754,899 | 7/1956 | Karobonik | 4/502 |
| 3,510,996 | 5/1970 | Popil | 160/84 R |
| 4,348,833 | 9/1982 | Nagoya | 47/17 |
| 4,390,054 | 6/1983 | Niibori | 160/265 |
| 4,399,954 | 8/1983 | Arrant | 242/86.52 |

FOREIGN PATENT DOCUMENTS

| | | | |
|---|---|---|---|
| 151291 | 10/1981 | Fed. Rep. of Germany | 242/67.4 |
| 352590 | 4/1961 | Switzerland | 160/265 |
| 393706 | 11/1965 | Switzerland | 160/66 |

Primary Examiner—Stuart S. Levy
Assistant Examiner—Lloyd D. Doigan
Attorney, Agent, or Firm—Steinberg & Raskin

[57] ABSTRACT

A winding rod is mounted for rotation in winding and unwinding directions about a fixed axis of rotation. An elongated flexible member has one end affixed to the winding rod. A traction device is operatively connected to the flexible member for selectively pulling the flexible member at a predetermined speed in the winding and unwinding directions. A first driving device is rotatable in normal and reverse directions and includes a torque motor for driving the winding rod. A clutch operatively couples the driving device to the winding rod and is maintained in a disengaged state during the unwinding operation of the winding rod by making the speed of rotation of the driving device in the reverse direction higher than the speed of rotation of the winding rod in the unwinding direction.

14 Claims, 10 Drawing Figures

APPARATUS FOR WINDING AND UNWINDING AN ELONGATED FLEXIBLE MEMBER

BACKGROUND OF THE INVENTION

The present invention relates to an apparatus for winding and unwinding an elongated flexible member. More particularly, the invention relates to apparatus for winding and unwinding an elongated flexible member such as plastic film, sheet material or a linear member onto a winding rod with a specific tension exerted thereon. The apparatus of the invention may be readily applied to opening and closing a flexible screen in a greenhouse, or the like.

In general, when an elongated flexible member such as plastic film or sheet material is wound onto a winding rod rotating at a constant speed, the diameter of the roll increases in proportion to the length of the material that has been rolled up and, consequently, the winding speed of the elongated flexible member increases. When the elongated flexible member being wound is supplied at a constant speed, or is moved at a constant speed with the free end thereof supported, the tension exerted on said elongated flexible member increases in proportion to the length of the rolled up material. Consequently, the torque on the winding rod increases, resulting in the breakage of the elongated flexible member or in overload of the motor driving the winding rod. It is known that in such a case the tension exerted on the elongated flexible member may be maintained substantially constant by utilizing a torque motor whose rotational speed decreases in inverse proportion to the increase in the torque on the winding rod.

However, if the purpose is simply to wind the elongated flexible member onto the winding rod, this end may be attained by utilizing a torque motor and rotating the winding rod in only one direction. However, if it is necessary to unwind the elongated flexible member, difficulty arises. When opening or closing a flexible screen in a greenhouse, for example, even if the winding rod is rotated in the reverse direction by means of the torque motor, the flexible screen will not extend, but will accumulate near the winding rod. Therefore, it is necessary to pull the free end of the flexible screen, via another drive source, simultaneously with the reverse operation of the winding rod, with said flexible screen rolled up on said rod. However, since the diameter of the roll of flexible screen on the winding rod varies during this unwinding operation, if the winding rod with the flexible screen rolled up theron is reversed at a constant speed, the speed at which the flexible screen unwinds also varies. Accordingly, in order to extend the flexible screen uniformly and smoothly, it is necessary to vary the traction speed of the free end of the flexible screen in accordance with the variation in the roll diameter. Consequently, if the flexible screen is unwound from the winding rod with a constant traction speed, and if the speed of said winding rod in reverse is too high in the early stages of the unwinding operation, in which the diameter of the roll of flexible screen on said winding is large, said flexible screen is unwound excessively and accumulates. On the other hand, if the reverse speed of the winding rod is too low, an excessive tension is exerted on the flexible screen, resulting in breakage thereof.

SUMMARY OF THE INVENTION

The principal object of the invention is to provide apparatus for smoothly winding and unwinding an elongated flexible member.

An object of the invention is to provide apparatus for winding and unwinding an elongated flexible member such as film, sheet material, or the like via a winding rod.

Another object of the invention is to provide apparatus for winding and unwinding an elongated flexible member while maintaining such member uniformly and smoothly.

Still another object of the invention is to provide apparatus for winding and unwinding an elongated flexible member while the traction speed remains constant.

Yet another object of the invention is to provide apparatus for winding and unwinding an elongated flexible member at a constant traction speed without utilizing any complicated and expensive device for varying the traction speed.

In accordance with the invention, apparatus is provided for winding and unwinding an elongated flexible member of the type wherein an end of said flexible member is affixed to a winding rod and the member is wound and unwound by winding said flexible member onto said winding rod or unwinding said flexible member from said winding rod, respectively. The apparatus comprises a winding rod mounted for rotation in both the winding and unwinding directions about a fixed axis of rotation. An elongated flexible member is affixed at an end thereof to the winding rod. A traction device is operatively connected to the flexible member for selectively pulling said flexible member at a predetermined speed in either of the winding or unwinding directions. A first driving device is rotatable in both the normal and reverse directions and includes a torque motor for driving the winding rod. A clutch operatively connects the driving device to the winding rod, wherein said clutch is adapted to be maintained in a disengaged state during the unwinding operation of said winding rod by making the speed of rotation of said driving device in the reverse direction higher that the speed of rotation of said winding rod in the unwinding direction.

BRIEF DESCRIPTION OF THE DRAWINGS

For a fuller understanding of the invention, reference is had to the following description, taken in connection with the accompanying drawings in which.

DESCRIPTION OF PREFERRED EMBODIMENTS

Figure 1:
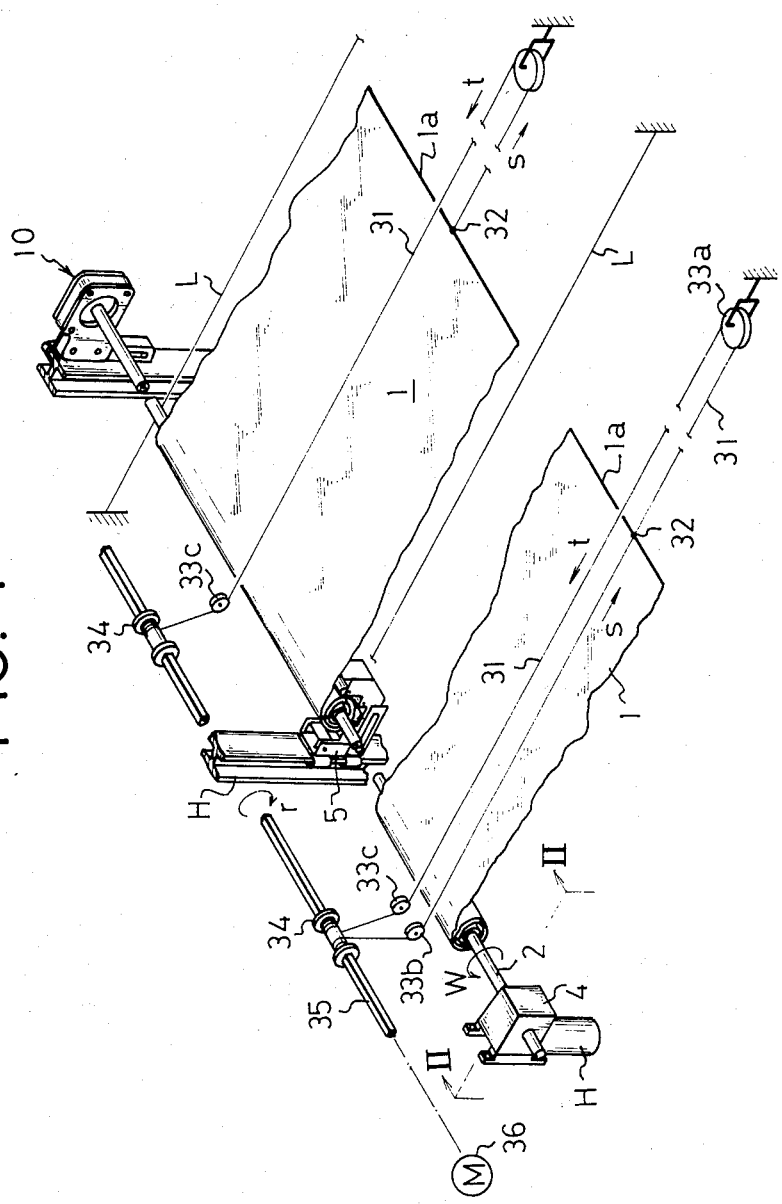
FIG. 1 is a simplified perspective view of a preferred embodiment of the apparatus of the invention.

FIG. 1 discloses apparatus for opening and closing a flexible screen stretched to form a partition inside a greenhouse, to which the invention is applied. One end of a flexible screen 1, forming a partition stretched inside a greenhouse, is attached to a winding rod 2, while the free end 1a thereof is connected and fixed by means of a clip 32 to a predetermined position on a travelling rope 31 constituting a traction device, hereinafter described. A drive source 4 drives the winding rod 2 to rotate. The drive source 4 includes a torque motor 41, a reduction mechanism 42 and a one-way clutch 44, hereinafter described.

In FIG. 1, supporting ropes L are stretched tightly in order to support the undersurface of the extended part of the flexible screen 1. Guide pulleys 33a, 33b, 33c support the travelling rope 31 passed over said pulleys and are each secured to frames, or the like, of the greenhouse (not shown in the FIGS.). A winding drum 34 either has one end of the travelling rope 31 affixed thereto, or both ends of said travelling rope affixed thereto in directions opposite to each other, thereby permitting said travelling rope to be wound and unwound. A drive shaft 35 is disposed on a side wall, ceiling, or the like, of the greenhouse and drives the winding drum 34. A motor M energizes the drive shaft 35 to rotate at a constant speed in either the normal or reverse directions. The motor M may be a standard induction motor, for example. Thus, the traction device is constituted by the mechanisms 31, 32, 33a to 33c, 34, 35 and 36.

When the drive shaft 35 is rotated in the direction of the arrow r, the travelling rope 31 moves in the directions of the arrows s and t, causing the flexible screen 1 to be pulled at a constant speed and to be forcedly unwound from the winding rod 2. As a result, the flexible screen 1 is extended in the closing direction, as illustrated. Conversely, when opening the flexible screen 1, that is, when winding said screen onto the winding rod 2, the travelling rope 31 is moved in reverse at a constant speed by rotating said winding rod in the normal direction. That is, the winding rod 2 is rotated in the direction of the arrow W, as well as the travelling rope 31 rotating the drive shaft 35 in a direction opposite the direction of the arrow r. This results in the moving of the flexible screen 1, which is trying to move at a gradually increasing speed, at a constant speed by restraint of the free end 1a.

A member 5 supports the rolled screen and is affixed to a frame H of the greenhouse. The rolled screen supporting member 5 is designed to hold the flexible screen 1 wound on the winding rod 2 directly. A plurality of rolled screen supporting members 5 may be installed on a plurality of frames H (not shown in the FIGS.) at any desired positions along the longitudinal direction of the winding rod 2.

Furthermore, one end of the winding rod 2 is rotatably supported by a swivel bearing member 10, hereinafter described.

Figure 2:
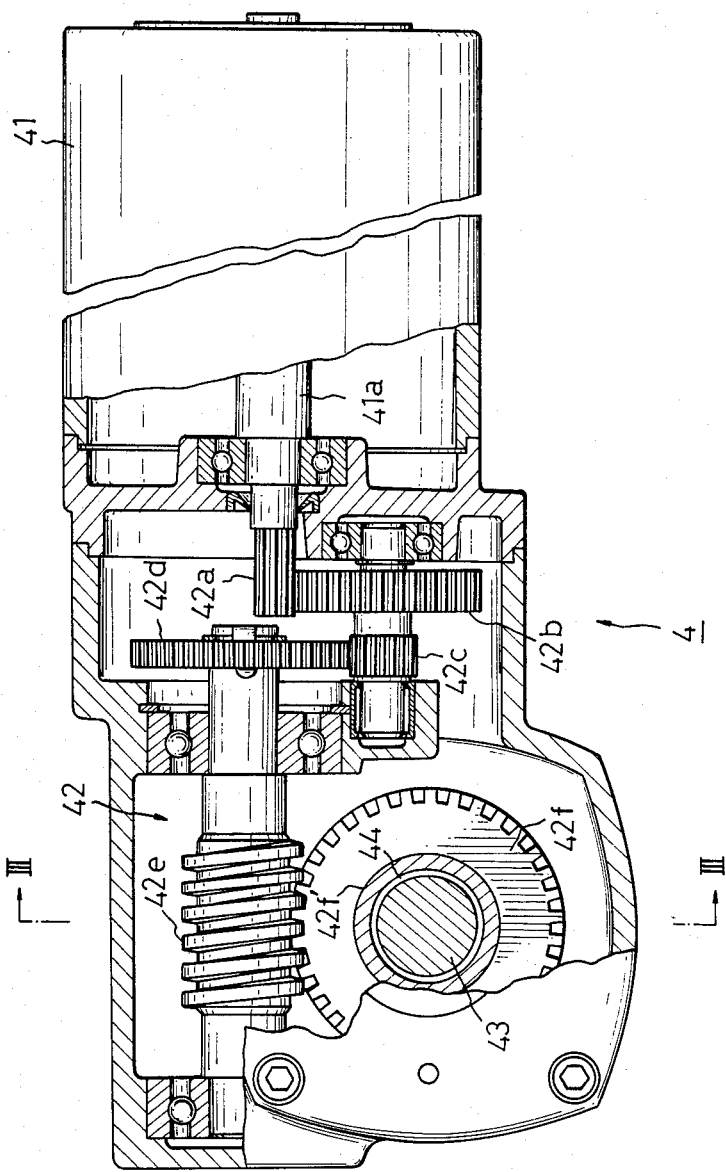
FIG. 2 is a view, on an enlarged scale, partly in section, taken along the lines II—II, of FIG. 1.
Figure 3:
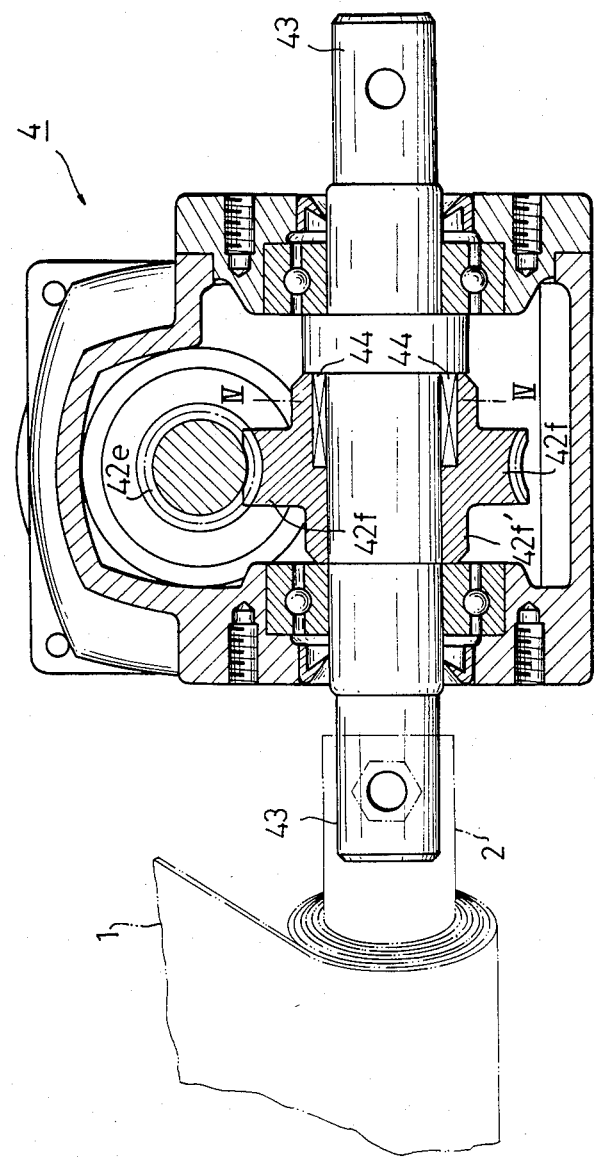
FIG. 3 is a view, on an enlarged scale, partly in section, taken along the lines III—III, of FIG. 2.

FIGS. 2 and 3 in combination show an example of the drive source 4 which drives the winding rod 2. The drive source 4 includes a torque motor 41 having a motor shaft 41a, reduction spur gears 42a to 42d, a worm 42e, and a worm wheel 42f. The members 42a to 42f constitute the reduction mechanism 42. Because it employs a worm gear mechanism, the illustrated arrangement has the advantage of providing a locking effect when the motor 41 is at the step position. Any other known reduction gear may be utilized. An output shaft 43 connected to the winding rod 2 is slidably received by an input shaft 42f' formed integrally with the worm wheel 42f, and is designed to transmit a rotational force in the winding direction of said winding rod through a one-way clutch 44. Although the roller clutch mechanism 44' shown in FIG. 4 is shown as the one-way clutch 44 of this embodiment, the invention covers other embodiments of said one-way clutch such as, for example, a well known cam clutch, a one-way roller clutch, or a one-way clutch having a ratchet.

Figure 4:
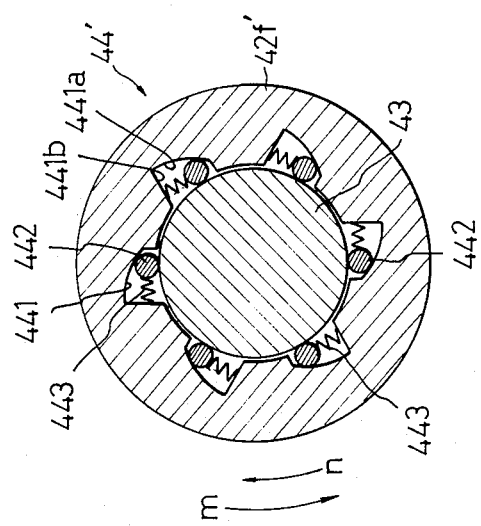
FIG. 4 is a sectional view, on an enlarged scale, taken along the lines IV—IV, of FIG. 3.

The roller clutch 44', as shown in FIG. 4, comprises longitudinal grooves 441 each formed along the inner peripheral surface of the input shaft 42f', in the axial direction thereof. Each of the longitudinal grooves 441 is provided with an inclined bottom 441a and each of said grooves slidably receives a rod-shaped roller 442. Each of a plurality of springs 443 is loaded between a corresponding roller 442 and a wall surface 441b of the corresponding longitudinal groove 441 and is adapted to press said roller toward the shallower side of the corresponding inclined bottom 441a, as shown in FIG. 4. All the inclined bottoms 441a of the longitudinal grooves 441 incline in the same direction, and the peripheral surface of the output shaft 43 is always in contact with the rollers 442.

When the input shaft 42f' rotates in the direction of the arrow m, the rollers 442 have a wedge effect on the input shaft 42f', permitting the rotational torque thereof to be transmitted to the output shaft 43. Conversely, when the input shaft 42f' rotates in the direction of the arrow n, the wedge effect is removed, so that no rotational torque is transmitted to the output shaft 43.

The action and effect of the invention is described with reference to FIG. 1, as follows. First, when winding the flexible screen 1 onto the winding rod 2, when the torque motor 41 is started so that the input shaft 42f' rotates in the direction of the arrow m in FIG. 4, the roller clutch 44' is brought into a state in which torque is transmitted. This causes the output shaft 43 and the winding rod 2 connected thereto to start rotating in the direction of the arrow m, that is, the direction of the arrow W of FIG. 1. Consequently, the flexible screen 1 is wound onto the winding rod 2 and the diameter of the roll gradually increases. Accordingly, the winding speed of the flexible screen 1 also tends to increase. At the same time, however, the reverse rotation of the motor 36 constituting the traction device causes the travelling rope 31 to travel at a constant speed in the direction opposite to the direction indicated by the arrows s and t, so that the acceleration of the free end 1a of the flexible screen 1 connected to said rope is controlled to maintain the speed constant.

Accordingly, there is an increase in the tension exerted on the flexible screen 1. In addition, the rotational torque on the winding rod 2 also increases in accordance with the increasing length of the rolled-up flexible screen 1. However, since the torque motor 41 is the prime mover driving the winding rod 2, the rotational speed of said motor 41 decreases in inverse proportion to the increase in torque on said winding rod, so that the rotational speed of said winding rod also decreases. Therefore, the flexible screen 1 held or restrained at its free end 1a by the travelling rope 31 is wound onto the winding rod 2 at a substantially constant tension and speed, independently of the increase in diameter of the roll. Accordingly, there is no possibility of the breakage of the flexible screen 1.

Second, to unwind or close the flexible screen 1, the drive shaft 35 is rotated in the direction of the arrow r by the constant-speed induction motor 36, and the torque motor 41 is rotated in reverse in a direction opposite to the direction of the arrow W. At the same time, the input shaft 42f' is driven in reverse by the torque motor 41, so it rotates in the direction of the arrow n of FIG. 4. Similarly, the output shaft 43, connected to the winding rod 2, also rotates in the direction in which the flexible screen 1 unwinds, that is, in the direction of the arrow n. In this case, by making the rotational speed of the input shaft 42f' driven by the torque motor 41 higher than the rotational speed of the output shaft 43, the roller clutch 44 is disengaged, so that the rotational torque of the input shaft 42f' is not transmitted to said output shaft.

Consequently, the winding rod 2 is idling, and the flexible screen 1 wound on said winding rod is unwound and extended by the traction force of the travelling rope 31. During this time, no abnormal tension is exerted on the unwinding screen 1, and it is unwound smoothly, since the speed of movement of the travelling rope 31 is constant. In this case, however, if the idling speed of the winding rod 2, that is, the idling speed of the output shaft 43, exceeds the rotational speed of the input shaft 42f' in the direction of the arrow n, the clutch 44' will be engaged in the same manner as when said input shaft rotates in the direction of the arrow m. In such case, the winding rod 2 is prevented from idling freely, a large tension is exerted on the unwinding screen 1, causing breakage or stretching of said screen beyond the limit of elasticity thereof. In other words, the rotational speed of the winding rod 2 idling against the traction force on the unwinding screen 1 is a minimum at the very start of the unwinding of said screen. Thereafter, the rotational speed of the winding rod 2 increases in inverse proportion to the decrease in the diameter of the roll of screen 1 wound on said winding rod and is a maximum just before the completion of the unwinding of said screen.

Therefore, the one-way clutch 44 is maintained disengaged in the apparatus of the invention until the unwinding of the screen 1 is completed, by making the rotational speed of the input shaft 42f' during the unwinding of said screen higher than the maximum rotational speed of the winding rod 2, as hereinbefore described. Thus, since the input shaft 42f' and the output shaft 43 are not actually engaged with each other, permitting the winding rod 2 to idle, the flexible screen 1 is unwound via the travelling rope 31 at a constant speed and no unnatural tension is exerted thereon.

In another embodiment of the invention, the output shaft 43 is omitted and the winding rod 2 is received directly by the input shaft 42f'.

The rolled screen supporting member 5 and the swivel bearing member 10 are described with reference to FIGS. 5 to 10.

Figure 5:
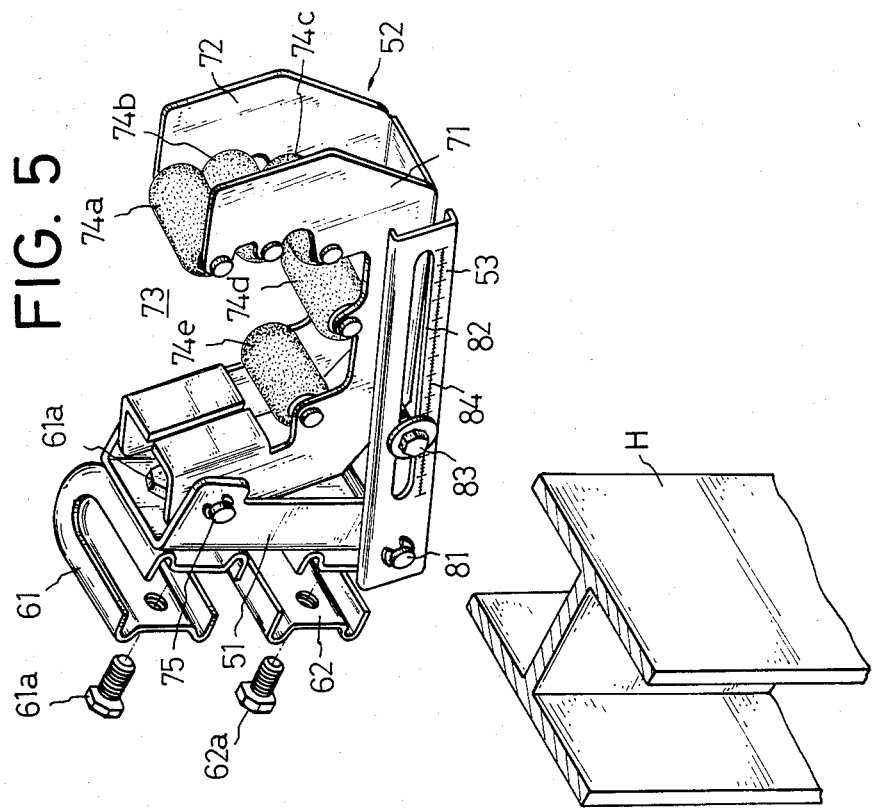
FIG. 5 is a perspective view, on an enlarged scale, of a member supporting the rolled screen of the apparatus of the invention.

The rolled screen supporting member 5, shown in FIG. 5, has a base frame 51 with a substantially channel-shaped cross-section and substantially U-shaped affixing members 61, 62 mounted on the rear surface thereof by bolts 61a, or the like. The base frame 51 is affixed to a frame H of a greenhouse by fitting the affixing members 61, 62 onto said frame H and then tightening the bolts 61a, 62a. A support frame 52 is constituted by substantially channel-shaped frame plates 71, 72 defining a U-shaped opening 73 capable of holding the flexible screen 1 wound on the winding rod 2. Rotatable support rollers 74a to 74e are disposed parallel to each other between the frame plates 71, 72 by pins positioned around the inner edge of the opening 73.

The support frame 52 is pivotally connected at the top of one end of the opening 73 to a part of the base frame 51 near its upper end by a pin 75. A link 53 regulates the angle of the support frame 52 to the base frame 51. One end of the link 53 is pivotally connected to a part of the base frame 51 near its lower end by a pin 81, and the other end of said link is free. A slot 82 is formed through the link 53 along a longitudinal center line thereof and a tightening bolt 83 is slidably received by said slot 82 and is screwed into part of the support frame 52 near its lower end. The angle regulating mechanism regulating the angle of the support frame 52 to the base frame 51 is thus composed of the constituent elements 53, 81, 82 and 83. An angle indication scale 84 is marked along the edge of the slot 82 and is provided as required.

Figure 6:
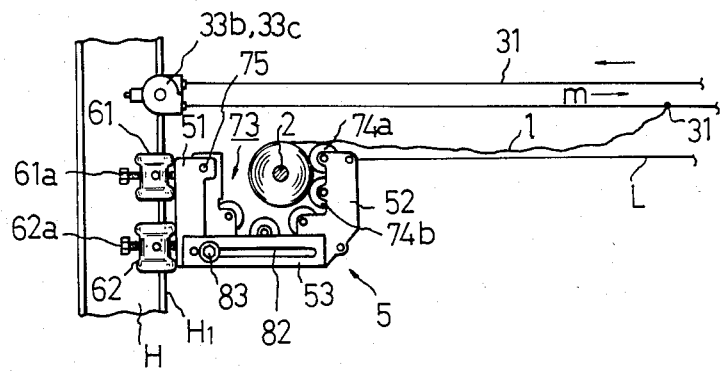
FIGS. 6 and 7 are views, on an enlarged scale, illustrating the operation of the rolled screen supporting member shown in FIG. 5.

FIG. 6 shows an example of the operation of the rolled screen supporting member 5 of FIG. 5. The base frame 51 is vertically affixed to a substantially vertical flange $H_1$ of the frame H of the greenhouse via the affixing members 61, 62. The flexible screen has one end attached to the winding rod 2 and is wound on said winding rod in the shape of a roll. The rolled screen 1 is loosely received by the opening 73 of the support frame 52 and is supported by the support rollers 74a to 74e. Thus, in this example, the support frame 52 is supported by the base frame 51 so that said support frame does not pivot about the pin 75; that is, the link 53 is not used.

Figure 7:
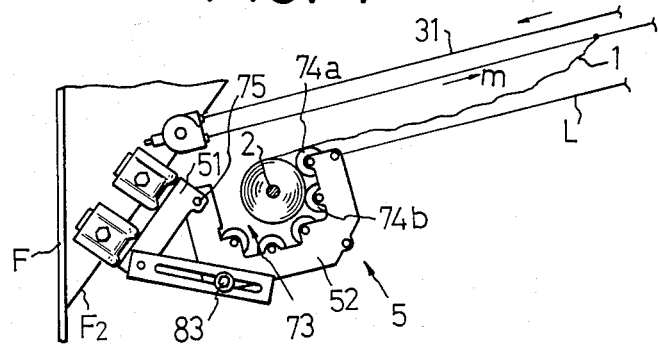

FIG. 7 shows an example of the operation of the rolled screen supporting member 5 of FIG. 5 when the base frame 51 is affixed to an inclined surface $F_2$ of a frame F and the screen 1 is extended obliquely. In this case, the support frame 52 is affixed to the base frame 51 in a position at an angle made by pivoting said support frame 52 about the pin 75, as illustrated, and then tightening the bolt 83.

Figure 8:
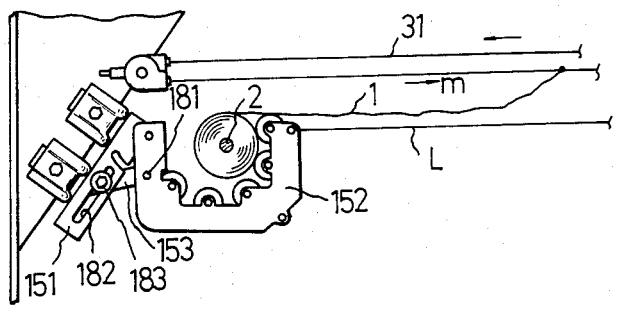
FIG. 8 is a view, on an enlarged scale, illustrating the operation of another example of the rolled screen supporting member of the apparatus of the invention.

FIG. 8 shows another example of the angle regulating mechanism provided for the rolled screen supporting member 5 of FIG. 5. In the example of FIG. 8, one end of a link 153 is pivotally affixed to a support frame 152 by a pin 181 and a tightening bolt 183 is disposed at a suitable position on said link. A slot 182 for slidably receiving the bolt 183 is formed along a base frame 151 and extends for a necessary length. The operation and effect of the angle regulating mechanism of FIG. 8 are the same as those shown in FIGS. 5 to 7.

Thus, in the foregoing examples, when the screen 1 is pulled out, so that it is unwound, by moving the travelling rope 31 in the direction of the arrow m by driving means (not shown in the FIGS.), the winding rod 2 is rotated to unwind said screen, while receiving a pulling stress substantially in the direction of the arrow m. However, the movement of the winding rod 2 in response to the stress is restricted by the support roller 74a and/or the support roller 74b, so that there is no possibility of said winding rod escaping from the opening 73. Furthermore, since the direction of delivery of the screen 1 is maintained in a substantially tangential direction relative to the circumference of the rolled screen, the unwinding thereof is effected smoothly.

When the winding rod 2 is elongated, a plurality of supporting members 5 may be provided at predetermined intervals. When all the support frames 52 are affixed to the corresponding base frames 51 at a predetermined pivotal angle, as shown in FIGS. 7 and 8, the scale 84 provided along the slot 82 (FIG. 5) would enable the positioning of a large number of supporting members 5, when they are affixed to the frames of the greenhouse, improving the operating efficiency.

The swivel bearing member 10, which rotatably supports one end of the winding rod 2 in FIG. 1, is hereinafter described in detail with reference to FIGS. 9 and 10.

Figure 9:
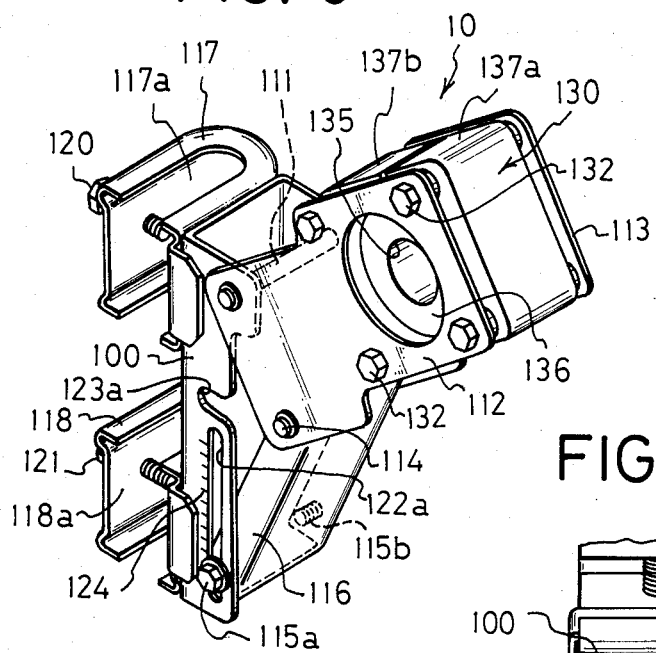
FIG. 9 is a perspective view, on an enlarged scale, of a swivel bearing member of the apparatus of the invention.
Figure 10:
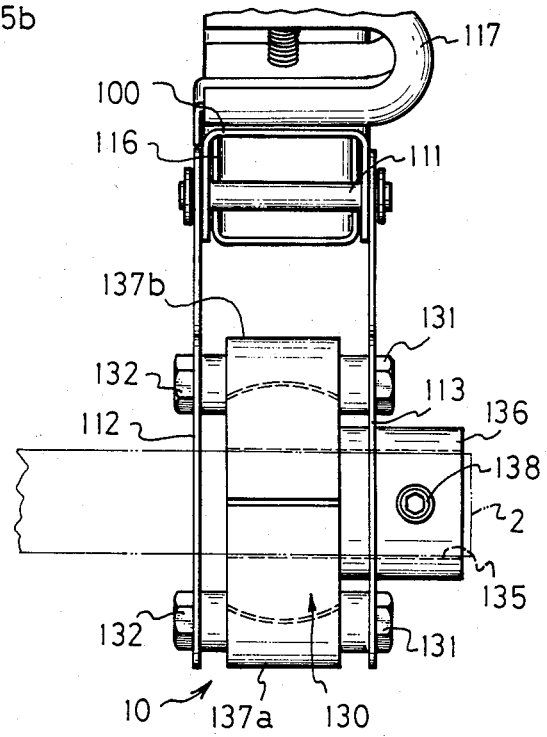
FIG. 10 is a partially cut-away plan view of the swivel bearing member of FIG. 9.

As shown in FIGS. 9 and 10, the swivel bearing member 10 has a substantially channel-shaped base frame 100, a first side frame 112 and a second side frame 113 pivotally connected to the base frame 100 by a pin 111, and a substantially U-shaped link 116 disposed between the two side frames 112, 113 and the base frame 100 by a pin 114 and bolts 115a, 115b.

The base frame 100 has substantially U-shaped affixing members 117, 118 secured to the rear surface thereof. The swivel bearing member 10 is affixed to a greenhouse frame, not shown, by fitting substantially U-shaped openings 117a, 118a, defined by the affixing members 117 and 118, respectively, onto the greenhouse frame and then tightening bolts 120 and 121, respectively.

The base frame 100 has slots 122a, 122b (not shown) formed in its side surfaces, respectively, each slidably guiding the bolts 115a, 115b screwed to the corresponding end of the link 116, and relief grooves 123a, 123b (not shown) formed in its side surfaces for the pin 114. Each of the slots 122a, 122b is marked with a scale 124, if necessary.

A swivel bearing 130 is secured between the first and second side frames 112 and 113 via nuts and bolts 131, 132. The swivel bearing 130 comprises a swivel 136 provided with a shaft-receiving bore 135, and swivel receivers 137a, 137b, which are two separate parts. The swivel receivers 137a and 137b are secured between the side frames 112, 113 by two nuts and bolts 131 and 132, respectively. The swivel 136 also has a set screw 138 screwed thereinto to lock one end of the winding rod 2 which is received by the shaft-receiving bore 135.

If one end of the winding rod 2 is rotatably supported by the swivel bearing member 10 having the aforedescribed structure, the deflection of said winding rod during the opening or closing operation of the flexible screen 1 may be absorbed at the end of said rod, thereby guaranteeing the smooth opening or closing operation of said screen.

Furthermore, the swivel bearing member 10 may be affixed at a predetermined position via the bolts 115a, 115b by regulation of the opening angle of the side frames 112, 113 with respect to the base frame 100 through the link 116, in the same manner as the rolled screen supporting member 5. Accordingly, the swivel bearing member 10 may be mounted on greenhouse frames of various shapes and may rotatably support one end of the winding rod 2, as appropriate.

In accordance with the invention, the apparatus of the invention for winding and unwinding an elongated flexible member, such as a flexible screen, operates smoothly without exerting any unnatural tension of said elongated flexible member such as a flexible screen not only during the winding operation, but also during the unwinding operation. Furthermore, there are no excessive stresses on the winding rod and the traction mechanism. There is thus no possibility of damage to the winding rod or the traction mechanism. Additionally, the members for holding or affixing these mechanisms such as, for example, the greenhouse frames, and the like, are hardly affected. Accordingly, the apparatus of the invention is suitable for winding and unwinding an elongated flexible member and is highly effective when utilized as a mechanism for opening and closing a flexible screen stretched inside a large-sized greenhouse, for example.

The invention is by no means restricted to the aforementioned details which are described only as examples; they may vary within the framework of the invention, as defined in the following claims.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. Apparatus for winding and unwinding an elongated flexible member of the type wherein an end of said flexible member is affixed to a winding rod and said flexible member is wound on said winding rod or unwound from said winding rod, respectively, said apparatus comprising a winding rod mounted for selective rotation in winding and unwinding directions about a fixed axis of rotation;

an elongated flexible member having one end affixed to said winding rod;

traction means operatively connected to said flexible member for selectively pulling said flexible member at a predetermined speed in said winding and unwinding directions;

first driving means selectively rotatable in normal and reverse directions and including a torque motor for driving said winding rod; and clutch means operatively coupling said driving means to said winding rod, said clutch means being maintained in a disengaged state during the unwinding operation of said winding rod by making the speed of rotation of said driving means in the reverse direction higher than the speed of rotation of said winding rod in the unwinding direction thereby considerably reducing tension of said flexible member during said unwinding operation.

2. Apparatus as claimed in claim 1, wherein said elongated flexible member comprises a flexible screen of a greenhouse, or the like.

3. Apparatus as claimed in claim 1, wherein said driving means includes a reduction mechanism including a worm gear mechanism with an input shaft formed integrally with a worm wheel.

4. Apparatus as claimed in claim 1, wherein said clutch means comprises a one-way roller clutch.

5. Apparatus as claimed in claim 1, wherein said traction means comprises an elongated driving shaft mounted for rotation about a fixed axis of rotation, second driving means for selectively rotating said driving shaft in normal and reverse directions, ropes each of which has two ends secured to said driving shaft with respective end portions thereof coiled on said driving shaft opposite each other, and guide means for guiding two portions of each of said ropes over a predetermined path of travel, each of said ropes being operatively connected at one of said two portions thereof to said flexible screen.

6. Apparatus as claimed in claim 2, wherein said flexible screen has another end and said traction means is operatively coupled to said flexible screen substantially at said other end thereof.

7. Apparatus as claimed in claim 2, further comprising rolled screen supporting means for supporting said flexible screen wound and rolled on said winding rod.

8. Apparatus as claimed in claim 3, wherein said input shaft is operatively connected to said winding rod through said clutch means.

9. Apparatus as claimed in claim 7, wherein said rolled screen supporting means comprises a base frame, a support frame pivotally mounted on said base frame and defining an opening for receiving the rolled screen, a plurality of rolled screen supporting rollers rotatably supported in said support frame and arranged to support said rolled screen in said opening along the periphery thereof, and angle-regulating means for regulating the angle between said support frame and said base frame.

10. Apparatus as claimed in claim 7, wherein said winding rod has spaced opposite ends, and further comprising a swivel bearing member for supporting one of said ends of said winding rod.

11. Apparatus as claimed in claim 9, wherein said angle-regulating means comprises a bolt screwed to said support frame and a link having a slot formed therethrough for slidably receiving said bolt and having one end pivotally coupled to said base frame.

12. Apparatus as claimed in claim 9, wherein said angle-regulating means comprises a link having one end pivotally coupled to said support frame and another end having a bolt threadedly coupled thereto, and a slot formed through said base frame for slidably receiving said bolt threadedly coupled to said link.

13. Apparatus as claimed in claim 10, wherein said swivel bearing member comprises a base frame, a pair of said frames pivotally coupled to said base frame, a swivel bearing mounted between said side frames, and additional angle-regulating means for regulating the angle between said side frames and said base frame.

14. Apparatus as claimed in claim 13, wherein said additional angle-regulating means comprises a link having one end pivotally coupled to said side frames and another end having a pair of bolts threadedly coupled thereto, and a pair of slots formed through said base frame for slidably receiving the corresponding bolts threadedly coupled to said link.

* * * * *